(12) United States Patent
Muto

(10) Patent No.: US 8,149,337 B2
(45) Date of Patent: Apr. 3, 2012

(54) VIDEO PROCESSING APPARATUS AND VIDEO PROCESSING METHOD

(75) Inventor: Yasuhiko Muto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 12/874,615

(22) Filed: Sep. 2, 2010

(65) Prior Publication Data

US 2011/0063516 A1    Mar. 17, 2011

(30) Foreign Application Priority Data

Sep. 15, 2009  (JP) ................................. 2009-213625

(51) Int. Cl.
*H04N 5/21* (2006.01)

(52) U.S. Cl. ......... 348/629; 348/628; 348/625; 382/266

(58) Field of Classification Search .......... 348/625–631, 348/606, 607; 382/266–273
See application file for complete search history.

(56) References Cited

U.S. PATENT DOCUMENTS

| | | | | |
|---|---|---|---|---|
| 5,432,563 A * | 7/1995 | Kasahara | ...................... | 348/629 |
| 5,926,577 A * | 7/1999 | Kasahara et al. | ............. | 382/266 |
| 6,043,853 A * | 3/2000 | Shimazaki et al. | ........... | 348/625 |
| 7,400,775 B2 * | 7/2008 | Ikeda et al. | .................. | 382/254 |
| 7,782,401 B1 * | 8/2010 | Chou | ............................ | 348/581 |
| 2009/0066818 A1 | 3/2009 | Lim et al. | | |
| 2009/0079876 A1 | 3/2009 | Takeshima et al. | | |
| 2010/0110300 A1 | 5/2010 | Ueno et al. | | |

FOREIGN PATENT DOCUMENTS

| | | |
|---|---|---|
| JP | 2001-189851 | 7/2001 |
| JP | 2008-520117 | 6/2008 |
| JP | 2008-228251 | 9/2008 |
| JP | 2008-281940 | 11/2008 |
| JP | 2008-295023 | 12/2008 |
| JP | 2009-010819 | 1/2009 |
| JP | 2009-070384 | 4/2009 |
| JP | 2009-81734 | 4/2009 |

OTHER PUBLICATIONS

Japanese Patent Application No. 2009-213625; Notice of Reasons for Rejection; Mailed Nov. 2, 2010 and Feb. 15, 2011 (English translation).

* cited by examiner

*Primary Examiner* — Michael Lee
(74) *Attorney, Agent, or Firm* — Blakely, Sokoloff, Taylor & Zafman LLP

(57) ABSTRACT

According to one embodiment, a video processing apparatus includes an input module and a video processor. The input module is configured to input a video signal. The video processor is configured to apply sharpening processing to pixels in a horizontal direction and pixels in a vertical direction, which are included in the video signal, and to apply image blur correction to the pixels in the horizontal direction and the pixels in the vertical direction based on an imaging model function.

6 Claims, 16 Drawing Sheets

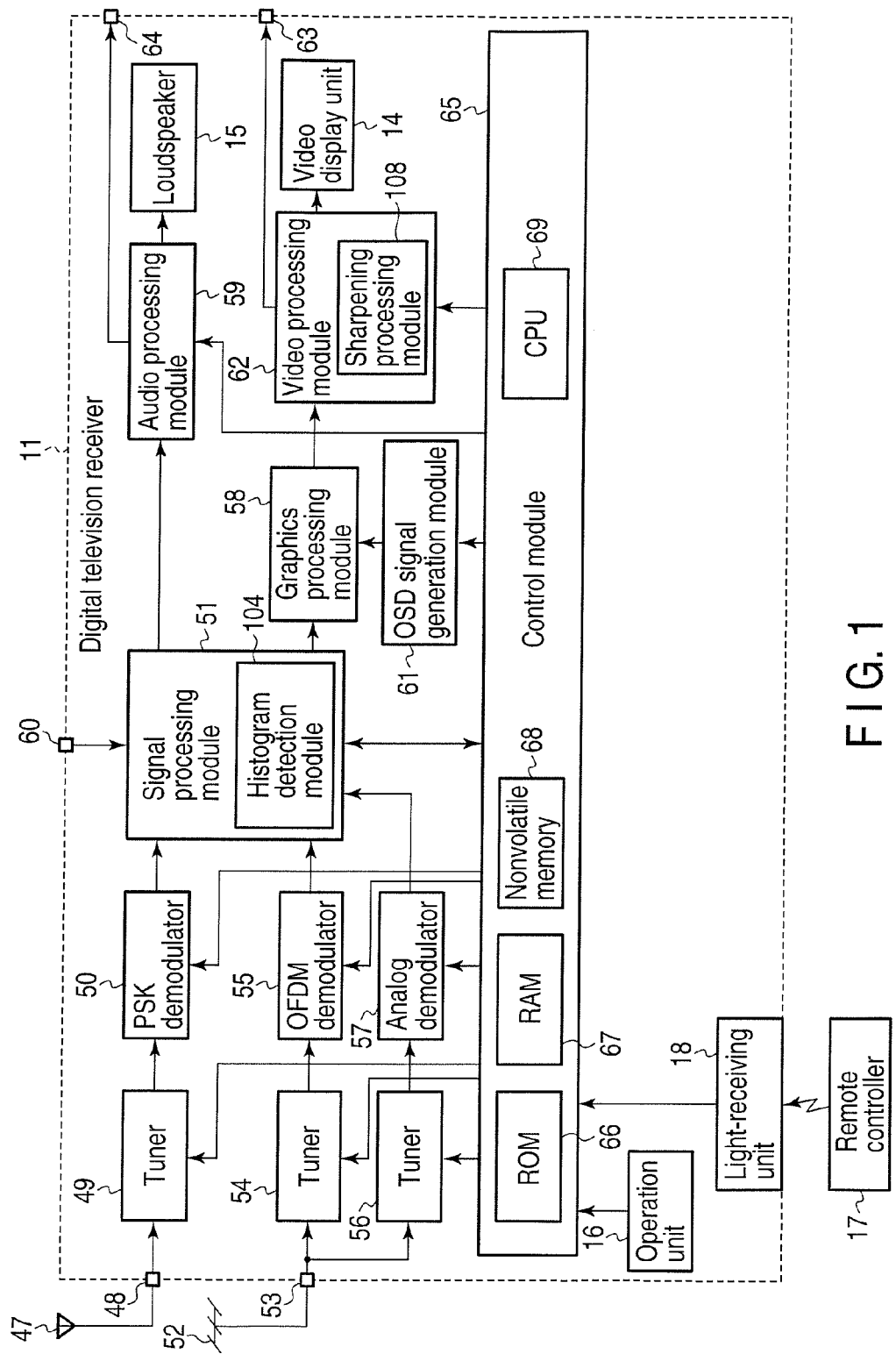
F I G. 1

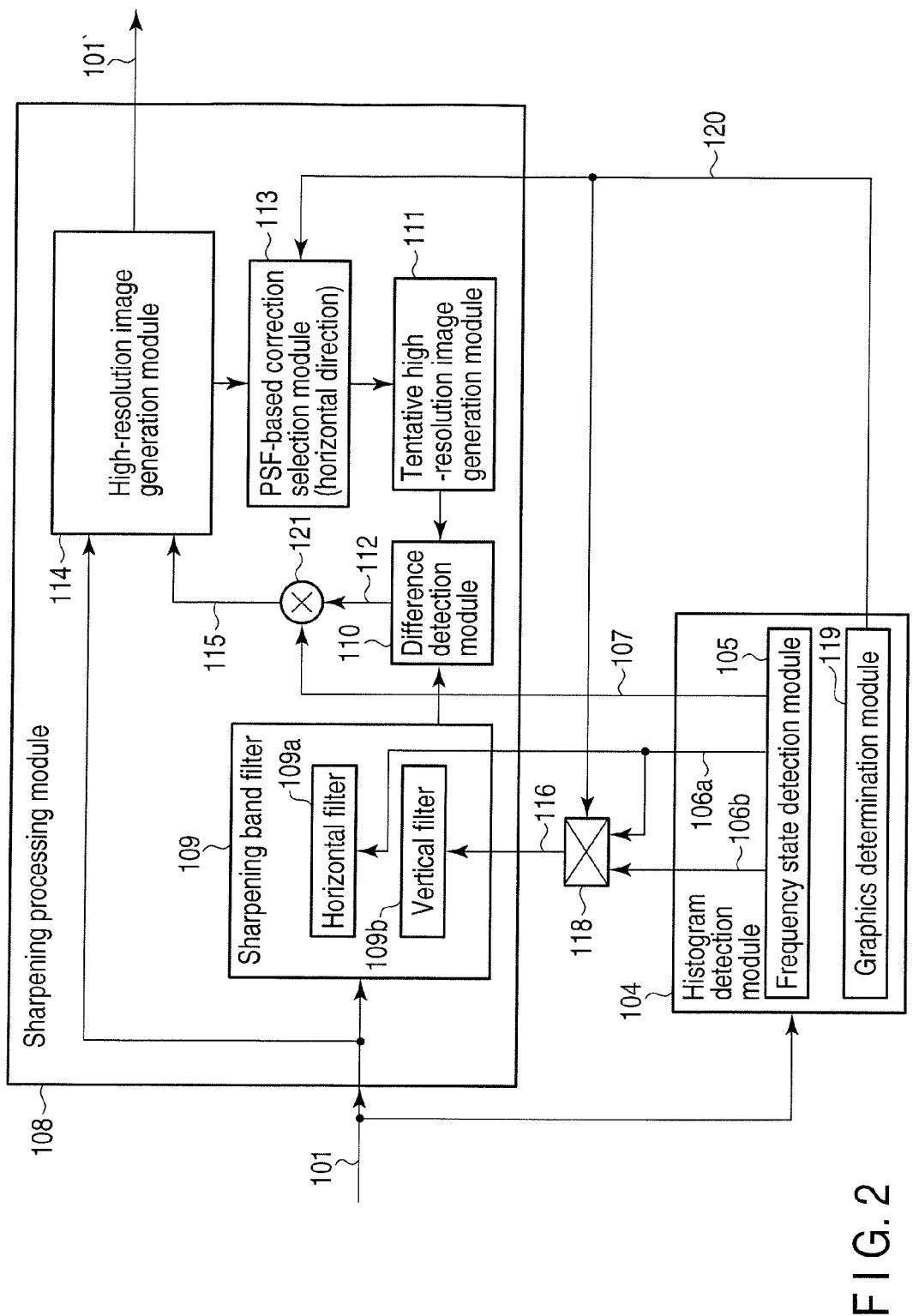
F I G. 2

|  | Parameter | | | | | | | |
|---|---|---|---|---|---|---|---|---|
|  |  | 1 | 2 | 3 | 4 | 5 | ... | n-1 | n |
| Horizontal | Signal 106a | H1 | H2 | H3 | H4 | H5 | ... | H(n-1) | H(n) |
| Vertical | Signal 116 | V1 | V2 | V3 | V4 | V5 | ... | V(n-1) | V(n) |
|  | (Signal 106b) | +PSF | +PSF | +PSF | +PSF | +PSF |  | +PSF | +PSF |

FIG. 13

|  | Parameter | | | | | | | |
|---|---|---|---|---|---|---|---|---|
|  |  | 1 | 2 | 3 | 4 | 5 | ... | n-1 | n |
| Horizontal | Signal 106a | H1 | H2 | H3 | H4 | H5 | ... | H(n-1) | H(n) |
| Vertical | Signal 116 (106a) | V1 | V2 | V3 | V4 | V5 | ... | V(n-1) | V(n) |

FIG. 14

| | Parameter | | | | | | | |
|---|---|---|---|---|---|---|---|---|
| | | 1 | 2 | 3 | 4 | 5 | ... | n-1 | n |
| Signal 130 | H1 | H2 | H3 | H4 | H5 | ... | H(n-1) | H(n) |
| Common to vertical /horizontal | +V1 +Vertical PSF | +V2 +Vertical PSF | +V3 +Vertical PSF | +V4 +Vertical PSF | +V5 +Vertical PSF | ... | +V(n-1) +Vertical PSF | +V(n) +Vertical PSF |

FIG. 16

| | Parameter | | | | | | | |
|---|---|---|---|---|---|---|---|---|
| | | 1 | 2 | 3 | 4 | 5 | ... | n-1 | n |
| Signal 130 | H1 | H2 | H3 | H4 | H5 | ... | H(n-1) | H(n) |
| Common to vertical /horizontal | +V1 | +V2 | +V3 | +V4 | +V5 | ... | +V(n-1) | +V(n) |

| | | Parameter | | | | | | |
|---|---|---|---|---|---|---|---|---|
| | | 1 | 2 | 3 | 4 | 5 | ... | n-1 | n |
| Horizontal | Signal 106a | H1 | H2 | H3 | H4 | H5 | ... | H(n-1) | H(n) |
| Vertical | Signal 116 | V1 | V2 | V3 | V4 | V5 | ... | V(n-1) | V(n) |
| | | +PSF | +PSF | +PSF | +PSF | +PSF | | +PSF | +PSF |

FIG. 22

| | | Parameter | | | | | | |
|---|---|---|---|---|---|---|---|---|
| | | 1 | 2 | 3 | 4 | 5 | ... | n-1 | n |
| Horizontal | Signal 106a | H1 | H2 | H3 | H4 | H5 | ... | H(n-1) | H(n) |
| Vertical | Signal 116 | V1 | V2 | V3 | V4 | V5 | ... | V(n-1) | V(n) |

VIDEO PROCESSING APPARATUS AND VIDEO PROCESSING METHOD

CROSS-REFERENCE TO RELATED APPLICATIONS

This application is based upon and claims the benefit of priority from Japanese Patent Application No. 2009-213625, filed Sep. 15, 2009; the entire contents of which are incorporated herein by reference.

FIELD

Embodiments described herein relate generally to a video processing apparatus and video processing method, which enhance video quality.

BACKGROUND

In recent years, opportunities for viewing video content using a personal computer display having a resolution exceeding a standard-resolution video (standard-definition [SD] video: 480×480 to 720×480) are increasing. Along with prevalence of high-definition broadcasting, television receivers compatible with a quasi-high-resolution video (1440×1080) and high-resolution video (full high-definition [full HD] video: 1920×1080) are in widespread use at home. An up-conversion technique for converting an SD video of, e.g., DVD video or a quasi-high-resolution video of, e.g., terrestrial digital broadcasting into a high-resolution video has been proposed accordingly.

Jpn. Pat. Appln. KOKAI Publication No. 2001-189851 (reference 1) discloses an image processing apparatus which can obtain a high-quality image without causing any interpolation blur or jaggies upon converting a low-resolution image into a high-resolution image. Even when artificially created characters, line images, and the like exist together with a natural image in a single image, this image processing apparatus can generate an image which reproduces the edges of character and line image portions and suppresses interpolation blur of the natural image portion.

An actually captured video which is captured using a video camera often suffers from image blur caused by the properties of the imaging element and lenses, and a technique for efficiently reducing such image blur is demanded.

Such image blur does not occur in all video content. Video content of, e.g., television broadcast programs includes video of different nature. For example, video content (actually captured video content) based on actually captured video and that (graphics video content) based on animation or CG are included. As is known, no image blur occurs in graphics video content. Hence, image blur correction need not be applied to graphics video content.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is a block diagram showing an example of the overall arrangement of a video processing apparatus according to the first to fifth embodiments.

FIG. 2 is a block diagram showing an example of the partial arrangement of the video processing apparatus according to the first embodiment.

FIG. 13 is a table showing an example of filter control parameters applied to non-graphics video.

FIG. 14 is a table showing an example of filter control parameters applied to a graphics video.

FIG. 16 is a table showing an example of filter control parameters applied to non-graphics video.

FIG. 17 is a table showing an example of filter control parameters applied to a graphics video.

FIG. 21 is a table showing an example of filter control parameters applied to non-graphics video.

FIG. 22 is a table showing an example of filter control parameters applied to a graphics video.

DETAILED DESCRIPTION

Figure 3:
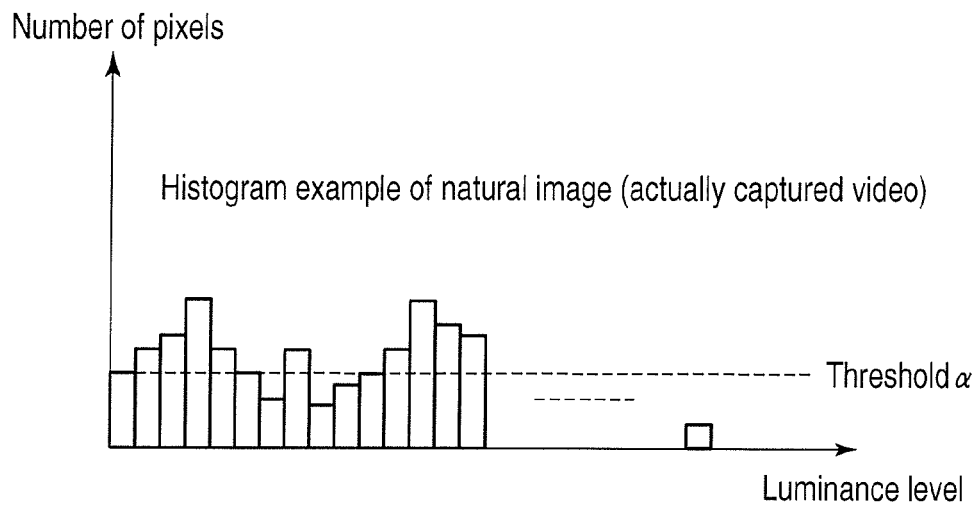
FIG. 3 is a graph showing an example of a histogram of an actually captured video input to the video processing apparatus according to the first to fifth embodiments.

Various embodiments will be described hereinafter with reference to the accompanying drawings.

In general, according to one embodiment, a video processing apparatus includes an input module and a video processor. The input module is configured to input a video signal. The video processor is configured to apply sharpening processing to pixels in a horizontal direction and pixels in a vertical direction, which are included in the video signal, and to apply image blur correction to the pixels in the horizontal direction and the pixels in the vertical direction based on an imaging model function.

The overall arrangement of a video processing apparatus (digital television receiver 11) common to the first to fifth embodiments will be described below with reference to FIG. 1.

A digital television receiver 11 includes a video display unit 14, loudspeaker 15, operation unit 16, light-receiving unit 18, broadcast signal input terminals 48 and 53, analog signal input terminal 60, output terminals 63 and 64, tuners 49, 54, and 56, PSK demodulator 50, OFDM demodulator 55, analog demodulator 57, signal processing module 51, audio processing module 59, graphics processing module 58, video processing module 62, OSD signal generation module 61, and control module 65.

To the broadcast signal input terminals 48 and 53, a BS/CS digital broadcast receiving antenna 47 and terrestrial wave broadcast receiving antenna 52 are respectively connected. The light-receiving unit 18 receives a signal output from a remote controller 17.

The control module 65 controls the operations of the respective units in the digital television receiver 11. The control module 65 includes a CPU 69, ROM 66, RAM 67, and nonvolatile memory 68. The ROM 66 stores control programs to be executed by the CPU 69. The nonvolatile memory 68 stores various kinds of setting information and control information. The CPU 69 loads a command group and data required for processing to the RAM 67 and executes processing.

The control module 65 receives operation information input on the operation unit 16 or that input by the remote controller 17 received via the light-receiving unit 18. The control module 65 controls the respective modules to reflect the nature of the operation.

The BS/CS digital broadcast receiving antenna 47 receives a satellite digital television broadcast signal. The BS/CS digital broadcast receiving antenna 47 outputs the received satellite digital television broadcast signal to the satellite digital broadcast tuner 49 via the input terminal 48. The tuner 49 tunes a broadcast signal of a channel selected by the user from this broadcast signal. The tuner 49 outputs the tuned broadcast signal to the phase-shift keying (PSK) demodulator 50. The PSK demodulator 50 demodulates the broadcast signal tuned by the tuner 49 into digital video and audio signals. The PSK demodulator 50 outputs the demodulated digital video and audio signals to the signal processing module 51.

The terrestrial wave broadcast receiving antenna 52 receives a terrestrial digital television broadcast signal and terrestrial analog television broadcast signal. The terrestrial wave broadcast receiving antenna 52 outputs the terrestrial digital television broadcast signal to the tuner 54 via the input terminal 53. The tuner 54 tunes a broadcast signal of a channel selected by the user from this broadcast signal. The tuner 54 outputs the tuned broadcast signal to the orthogonal frequency division multiplexing (OFDM) demodulator 55. The OFDM demodulator 55 demodulates the broadcast signal tuned by the tuner 54 into digital video and audio signals. The OFDM demodulator 55 outputs the demodulated digital video and audio signals to the signal processing module 51.

Also, the terrestrial wave broadcast receiving antenna 52 outputs the terrestrial analog television broadcast signal to the terrestrial analog broadcast tuner 56 via the input terminal 53. The tuner 56 tunes a broadcast signal of a channel selected by the user from this broadcast signal. The tuner 56 outputs the tuned broadcast signal to the analog demodulator 57. The analog demodulator 57 demodulates the broadcast signal tuned by the tuner 56 into analog video and audio signals. The analog modulator 57 outputs the demodulated analog video and audio signals to the signal processing module 51.

To the signal processing module 51, the input terminal 60 is connected. This input terminal 60 is used to externally input analog video and audio signals to the digital television receiver 11. The signal processing module 51 converts the analog video and audio signals input from the analog demodulator 57 or via the input terminal 60 into digital video and audio signals.

The signal processing module 51 applies predetermined digital signal processing to the converted digital video and audio signals and the digital video and audio signals input from the PSK demodulator 50 or OFDM demodulator 55. The signal processing module 51 outputs the video and audio signals that have undergone the predetermined digital signal processing to the graphics processing module 58 and audio processing module 59.

The graphics processing module 58 superimposes an on-screen display (OSD) signal such as a menu generated by the OSD signal generation module 61 on the digital video signal output from the signal processing module 51. The graphics processing module 58 outputs the video signal superimposed with the OSD signal to the video processing module 62. Alternatively, the graphics processing module 58 may selectively output the video signal as the output from the signal processing module 51 and the OSD signal as the output from the OSD signal generation module 61.

The video processing module 62 converts the input digital video signal into an analog video signal which can be displayed on the video display unit 14. The video processing module 62 outputs this analog video signal to the video display unit 14. The video display unit 14 displays video based on the input analog video signal. The video processing module 62 may further externally output the analog video signal via the output terminal 63.

The audio processing module 59 converts the input digital audio signal into an analog audio signal which can be played back by the loudspeaker 15. The audio processing module 59 outputs this analog audio signal to the loudspeaker 15. The loudspeaker 15 plays back audio based on the input analog audio signal. The audio processing module 59 may further externally output the analog audio signal via the output terminal 64.

The signal processing module 51 includes a histogram detection module 104. The video processing module 62 includes a sharpening processing module 108. In the signal processing module 51, a luminance signal Y of a video signal to be processed is input to the histogram detection module 104. The histogram detection module 104 generates a histogram based on the luminance signal Y, and generates parameters used in sharpening processing by the sharpening processing module 108 based on the generated histogram. In the video processing module 62, a video signal including a luminance signal Y, color difference signal Cb/Pb, and color difference signal Cr/Pr is input to the sharpening processing module 108. The sharpening processing module 108 sharpens the video signal based on the parameters generated by the histogram detection module 104, and corrects to reduce image blur of the video signal depending on video type.

FIG. 2 is a block diagram showing the arrangements of the histogram detection module 104 and sharpening processing module 108.

The histogram detection module 104 starts processing in response to input of a video signal 101 (e.g., a luminance signal Y). The histogram detection module 104 generates a histogram based on luminance levels of pixels of the video signal 101. More specifically, the histogram detection module 104 calculates the numbers of pixels for respective luminance levels for each frame of the video signal 101. In the following description, assume that the luminance levels are divided into n steps. Note that the number n of divisions of the luminance levels is sufficiently small (e.g., n=256). Also, let DIN(i) be the number of pixels for each luminance level. Note that i represents a luminance level, and can assume a value ranging from 1 to n.

The histogram detection module 104 includes a graphics determination module 119 (detector) and frequency state determination module 105 (controller). The graphics determination module 119 determines a type of the input video signal based on the calculated numbers of pixels for respective luminance levels (histogram). For example, the graphics determination module 119 determines whether the video signal is graphics video or non-graphics video. Non-graphics video includes actually captured video. Actually captured video is that captured using, e.g., a video camera. Graphics video is that created using animation or CG techniques.

Figure 4:
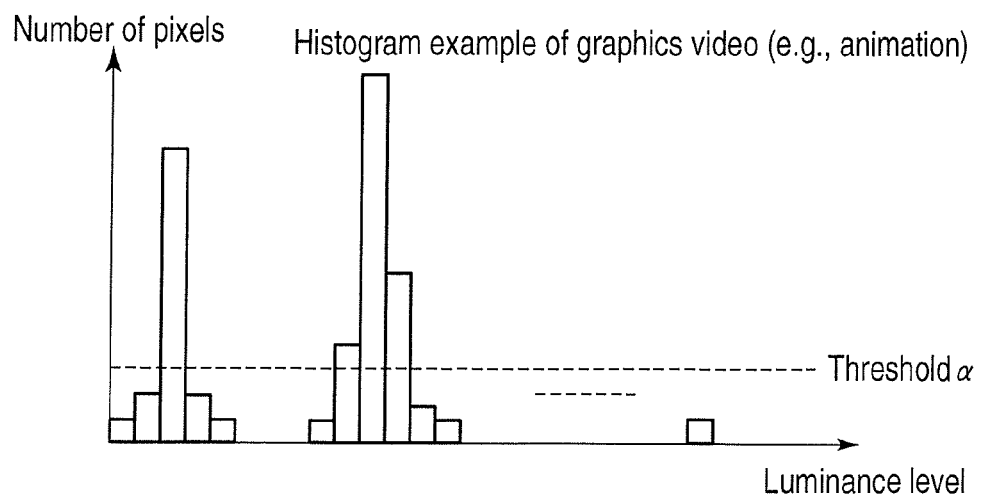
FIG. 4 is a graph showing an example of a histogram of a graphics video input to the video processing apparatus according to the first to fifth embodiments.

The histograms show different tendencies depending on the nature of the input video signals. FIGS. 3 and 4 respectively show an example of the histogram of a video frame of non-graphics video and an example of the histogram of a video frame of graphics video.

In the non-graphics video frame, the numbers of pixels for respective luminance levels tend to be distributed smoothly, as shown in FIG. 3. In other words, in the non-graphics video frame, the numbers of pixels for respective luminance levels change continuously. Therefore, the numbers of pixels between neighboring luminance levels are not likely to largely vary.

In the graphics video frame, the histogram tends to have distributions isolated for respective peaks, as shown in FIG. 4. In other words, in the graphics video frame, the numbers of pixels for respective luminance levels change discretely. Therefore, the numbers of pixels between neighboring luminance levels are more likely to largely vary.

Figure 5:
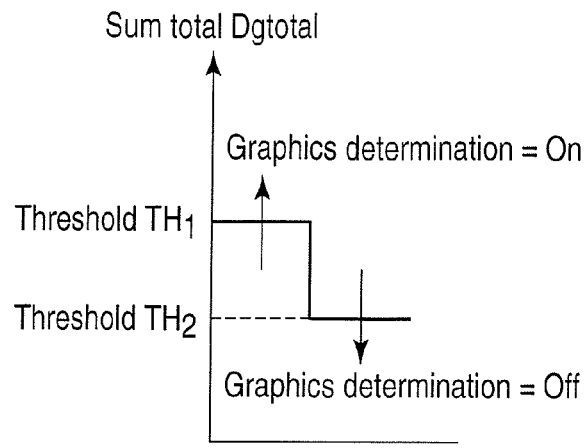
FIG. 5 is a graph for explaining an example of determination by a graphics determination module included in a histogram detection module shown in FIG. 2.

The graphics determination module 119 determines whether the input video signal is graphics video or non-graphics video using the aforementioned features, i.e., the tendency of the histogram. The graphics determination module 119 calculates absolute values of differences between the numbers of pixels of neighboring luminance levels for respective luminance levels, calculates the sum total of the calculated absolute values, and determines based on the calculated sum total whether the input video signal is graphics video or non-graphics video. As can be seen from the above features, the calculated sum total is more likely to assume a small value for non-graphics video, and to assume a large value for graphics video. Therefore, as shown in FIG. 5, when the calculated sum total is greater than a first threshold $TH_1$, the graphics determination module 119 determines that the video signal is a graphics video (graphics determination on); when the calculated sum total is less than a second threshold $TH_2$, it determines that the video signal is non-graphics video (graphics determination off). The graphics determination module 119 suppresses a determination result from fluctuating when the calculated sum total assumes a value close to a threshold, since it makes determination using the two thresholds, i.e., the first and second thresholds. That is, by making determination using the two thresholds, the graphics determination module 119 is provided with hysteresis characteristics.

A practical determination method by the graphics determination module 119 will be described below.

The graphics determination module 119 calculates a value obtained by subtracting a threshold $\alpha$ from the calculated number DIN(i) of pixels for each luminance level by:

$$DIN(i) = DIN(i) - \alpha$$

However, when DIN(i) calculated by above equation is less than 0, the module 119 sets:

$$DIN(i) = 0$$

This subtraction using the threshold $\alpha$ is made to eliminate the influence of noise components included in the video signal.

The graphics determination module 119 calculates the absolute value of the difference between the calculated DIN(i) values of neighboring luminance levels. The graphics determination module 119 calculates a sum $D_{gtotal}$ of the absolute values of the differences of the calculated DIN(i) values for respective luminance levels. That is, the graphics determination module 119 calculates $D_{gtotal}$ by:

$$D_{gtotal} = \sum_{i=1}^{n-1} |DIN(i) - DIN(i+1)|$$

The graphics determination module 119 then determines based on the calculated $D_{gtotal}$ whether the video signal is graphics video or non-graphics video. When $D_{gtotal}$ is greater than threshold $TH_1$, the graphics determination module 119 turns graphics determination on. When $D_{gtotal}$ is less than threshold $TH_2$, the graphics determination module 119 turns graphics determination off. The graphics determination module 119 suppresses the determination result from fluctuating when the calculated sum total assumes a value close to a threshold, since it makes determination using the two thresholds, i.e., the first threshold $TH_1$ and second threshold $TH_2$, as described above.

The first threshold $TH_1$ and second threshold $TH_2$ are calculated as follows. A threshold TH which does not take into account any hysteresis characteristics is calculated first. The threshold TH is, for example, 1/16 of the number of pixels of a video frame to be processed. Therefore, when the video frame to be processed includes 1920 pixels×1080 pixels, the threshold TH is calculated by 1920×1080/16=129600. The first threshold $TH_1$ and second threshold $TH_2$ are decided based on the calculated threshold TH in consideration of the hysteresis characteristics. Therefore, for example, a value obtained by adding a predetermined value to the threshold TH is set as the first threshold $TH_1$. On the other hand, for example, a value obtained by subtracting a predetermined value from the threshold TH is set as the second threshold $TH_2$.

The graphics determination module 119 outputs a control parameter 120 indicating whether graphics determination is on or off to a point-spread-function-based (PSF-based) correction selection module 113. The PSF-based correction selection module 113 can enable or disable to set a correction based on the PSF required to suppress image blur. In non-graphics video captured using a video camera, image blur often occurs because of the properties of the imaging element and lenses. For this reason, by applying image quality enhancement processing using the PSF as an imaging model function to non-graphics video, image blur can be suppressed. Note that the determination result of the graphics determination module 119 may be used not only in the sharpening processing module 108 but also in respective modules in the digital television receiver 11.

The frequency state determination module 105 detects a frequency state of a luminance signal Y included in the video signal 101 using histograms for respective frames generated by the histogram detection module 104. More specifically, the frequency state determination module 105 generates a filter control parameter 106a required to extract components to be sharpened from the video signal 101, and a sharpening effect control parameter (sharpening effect gain/low signal coring control signal) 107 based on the frequency distribution of the luminance signal Y. The frequency state determination module 105 outputs the calculated filter control parameter 106a to a horizontal filter 109a included in a sharpening band filter 109, and the sharpening effect control parameter 107 to a parameter adjustment module 121.

Figure 12:
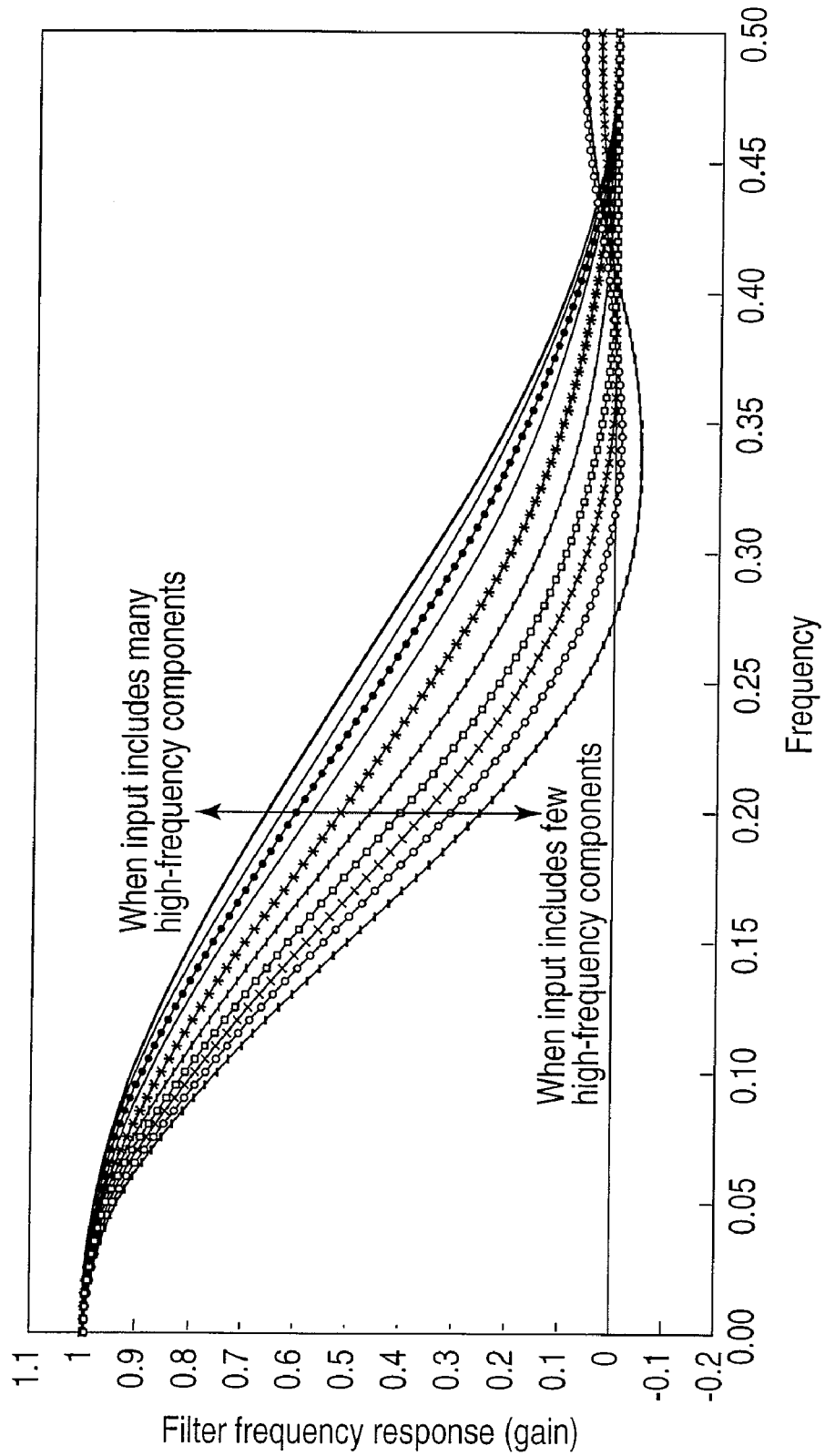
FIG. 12 is a graph showing an example of variable filter characteristics of the video processing apparatus according to the first to fifth embodiments.

FIG. 12 is a graph showing an example of variable filter characteristics based on the filter control parameter 106a. In order to provide an optimal video that matches image quality, the filter control parameter 106a is used to vary control depending on a case in which an input signal includes few high-frequency components or a case in which an input signal includes many high-frequency components.

The sharpening processing module 108 includes the sharpening band filter 109, a difference detection module 110, a tentative high-resolution image generation module 111 (correction module), the PSF-based correction selection module 113 (correction module), a high-resolution image generation module 114, and the parameter adjustment module 121. The sharpening band filter 109 includes the horizontal filter 109a and a vertical filter 109b. The sharpening processing module 108 applies sharpening processing to the video signal 101 in response to input of the video signal 101 including a luminance signal Y, color difference signal Cb/Pb, and color difference signal Cr/Pr.

The horizontal filter 109a included in the sharpening band filter 109 extracts components to be sharpened from the luminance signal Y, color difference signal Cb/Pb, and color difference signal Cr/Pr included in the video signal 101 based on the filter control parameter 106a from the frequency state determination module 105. Furthermore, the horizontal filter 109a extracts a texture portion to be sharpened, which includes a minute pattern, of the texture portion, an edge portion including lines and boundaries, and a flat portion such as a background, which are included in the video signal 101. The horizontal filter 109a outputs the extracted components to the difference detection module 110.

The vertical filter 109b included in the sharpening band filter 109 extracts components to be sharpened from the luminance signal Y, color difference signal Cb/Pb, and color difference signal Cr/Pr included in the video signal 101 based on the filter control parameter 106a or a filter control parameter 106b from the frequency state determination module 105. Furthermore, the vertical filter 109b extracts a texture portion to be sharpened, which includes a minute pattern, of the texture portion, an edge portion including lines and boundaries, and a flat portion such as a background, which are included in the video signal 101. The vertical filter 109b outputs the extracted components to the difference detection module 110.

The filter control parameter 106b is that obtained by correcting the filter control parameter 106a based on a PSF in the vertical direction (video model function). FIG. 14 is a table showing an example of the filter control parameter 106a. As shown in FIG. 14, for example, the filter control parameter 106a is a variable parameter of n steps, and can have parameters H1, H2, H3, ..., H(n) required to sharpen pixels in the horizontal direction. Also, the filter control parameter 106b can have parameters V1, V2, V3, ..., V(n) required to sharpen pixels in the vertical direction.

FIG. 13 is a table showing an example of the filer control parameters 106a and 106b. For example, the filter control parameters 106a and 106b are variable parameters of n steps, and a correction amount of the filter control parameter 106b by a PSF in the vertical direction is uniform. Note that FIG. 13 shows the filter control parameter 106b as a parameter obtained by adding the correction amount to the filter control parameter 106a. However, the filter control parameter 106b may be calculated by any of four operations.

A switching circuit 118 decides based on the control parameter 120 which of the filter control parameters 106a and 106b is to be used. For example, the switching circuit 118 decides use of the filter control parameter 106a based on the control parameter 120 corresponding to graphics determination being on, and outputs the filter control parameter 106a as a selection signal 116. The switching circuit 118 decides use of the control filter parameter 106b based on the control parameter 120 corresponding to graphics determination being off, and outputs the filter control parameter 106b as the selection signal 116.

The PSF-based correction selection module 113 selects a PSF (imaging model function) used in correction based on the control parameter 120 input from the graphics determination module 119. More specifically, when the control parameter 120 indicates graphics determination is off (when the video signal is determined as non-graphics video), the PSF-based correction selection module 113 sets a PSF that takes into account image blur in an imaging model function used in correction. On the other hand, when the control parameter 120 indicates graphics determination is on (when the video signal is determined as graphics video), the PSF-based correction selection module 113 sets a PSF that does not take into account any image blur (that of flat correction) in an imaging model function used in correction. That is, the PSF-based correction selection module 113 selectively sets the PSF which does not take into account any image blur and that which takes into account image blur in the imaging model function based on whether graphics determination is on or off indicated by the control parameter 120.

Figure 6:
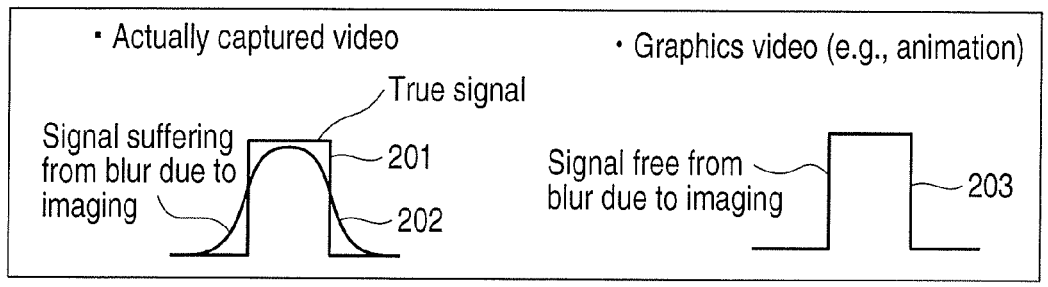
FIG. 6 is a view for explaining imaging model functions of an actually captured video and graphics video used in the video processing apparatus according to the first to fifth embodiments.

FIG. 6 shows examples of imaging model functions respectively used for non-graphics video and graphics video.

In a video signal of non-graphics video (e.g., actually captured video), image blur occurs because of the properties of the imaging element and lenses of a camera (video camera) used in imaging. That is, the camera captures a point spread signal 202 which suffers from image blur in place of a true signal 201 free from any image blur. For this reason, the imaging model function for non-graphics video uses a PSF based on the point spread signal 202 which suffers from image blur.

On the other hand, a video signal of graphics video is free from any image blur since it is created using animation or CG techniques. For this reason, the imaging model function for graphics video uses a flat PSF based on a signal 203 free from any image blur.

As described above, since the PSFs having optimal characteristics respectively for non-graphics video and graphics video are set in the imaging model functions, videos to which image quality processes suited to the respective videos are applied can be generated.

The tentative high-resolution image generation module 111 generates a tentative high-resolution image by correcting pixels in the horizontal direction of an image output from the high-resolution image generation module 114 based on the imaging model function set by the PSF-based correction selection module 113. The tentative high-resolution image generation module 111 outputs the generated tentative high-resolution image to the difference detection module 110.

The difference detection module 110 generates a difference parameter 112 indicating a difference between the tentative high-resolution image generated by the tentative high-resolution image generation module 111 and the components extracted by the horizontal filter 109a and vertical filter 109b. The difference detection module 110 outputs the generated difference parameter 112 to the parameter adjustment module 121. Note that the difference detection module 110 may generate a difference between the input video signal (original video signal) and the tentative high-resolution image generated by the tentative high-resolution image generation module 111 as the difference parameter 112.

The parameter adjustment module 121 generates a parameter 115 by adjusting the difference parameter 112 generated by the difference detection module 110 using the sharpening effect control parameter 107 generated by the frequency state determination module 105. More specifically, the parameter adjustment module 121 executes optimization control of a sharpening effect gain and low signal coring for the difference parameter 112 using the sharpening effect control parameter 107. The parameter adjustment module 121 outputs the generated parameter 115 to the high-resolution image generation module 114.

The high-resolution image generation module 114 adds the parameter 115 to the original video signal 101 (luminance signal Y, color difference signal Cb/Pb, and color difference signal Cr/Pr). The high-resolution image generation module 114 outputs a video signal 101' including a luminance signal Y', color difference signal Cb'/Pb', and color difference signal Cr'/Pr', which are sharpened by the aforementioned processing.

Note that this sharpening processing may be repetitively applied to one video frame. The sharpening processing is repeated until, for example, the difference parameter 112 detected by the difference detection module 110 becomes equal to or less than a threshold. By repeating the sharpening processing, an accurate high-resolution image can be generated.

Figure 7:
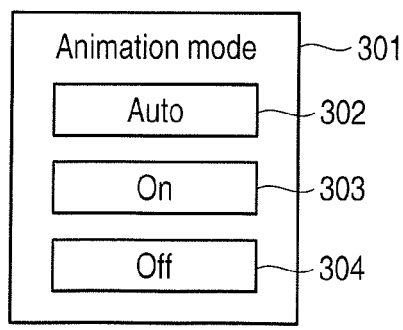
FIG. 7 is a view showing an example of an animation mode setting screen displayed by the video processing apparatus according to the first to fifth embodiments.

The user may set by an input using the operation unit 16 or remote controller 17 whether the input video signal (video content to be viewed) corresponds to non-graphics video or graphics video. FIG. 7 shows an example of an animation mode selection screen 301 displayed on the video display unit 14.

The animation mode selection screen 301 includes an auto button 302, ON button 303, and OFF button 304. The user selects one of these three buttons from the animation mode selection screen 301.

When the user selects the auto button 302, the graphics determination module 119 determines based on the histogram whether the input video signal is non-graphics video or graphics video. The PSF-based correction selection module 113 selects an imaging model function based on the determination result. That is, when the input video signal is non-graphics video, the PSF-based correction selection module 113 sets the PSF that takes into account image blur in the imaging model function; when the input video signal is graphics video, it sets the PSF that does not take into account any image blur (PSF for flat correction) in the imaging model function.

Likewise, when the input video signal is non-graphics video, the PSF control in the vertical filter 109b selects the filter control parameter 106b; when the input video signal is graphics video, it selects the filter control parameter 106a.

When the user selects the ON button 303, the PSF-based correction selection module 113 sets the PSF that does not take into account any image blur (PSF for flat correction) in the imaging model function. When the user selects the OFF button 304, the PSF-based correction selection module 113 sets the PSF that takes into account image blur in the imaging model function. When the user selects the ON button 303 or OFF button 304, a parameter which is the same as the control parameter 120 indicating whether graphics determination is on or off is input to the PSF-based correction selection module 113. The PSF-based correction selection module 113 switches the imaging model function according to the input parameter, as described above.

Likewise, when the user selects the ON button 303, the PSF control in the vertical filter 109b selects the filter control parameter 106a; when the user selects the OFF button 304, it selects the filter control parameter 106b.

In this way, when the user selects the auto button 302, the graphics determination module 119 can automatically determine whether the input video signal is non-graphics video or graphics video. When the user selects the ON button 303 or OFF button 304, he or she can manually turn graphics determination on or off.

The graphics determination module 119 may also determine using EPG information (program information) appended to the input video signal whether the input video signal is an actually captured video or graphics video. The EPG information includes, for example, genre information of the video content (program). For example, when the video content is an animation program, the EPG information includes genre information indicating "animation". On the other hand, for example, when the video content is a news program, the EPG information includes genre information indicating "news".

For example, when the genre information included in the EPG information indicates "animation" (that is, when it indicates that the input video content [input video signal] is an animation program), the graphics determination module 119 varies one or both of thresholds $TH_1$ and $TH_2$ shown in FIG. 5 to be closer to graphics determination being on at the time of determination. On the other hand, when the genre information included in the EPG information indicates "news" (i.e., when it indicates that the input video content [input video signal] is a news program), the graphics determination module 119 varies one or both of thresholds $TH_1$ and $TH_2$ shown in FIG. 5 to be closer to graphics determination being off at the time of determination. That is, the graphics determination module 119 changes, based on the genre information, thresholds $TH_1$ and $TH_2$ used to determine whether an input video signal is an actually captured video or graphics video.

As described above, the graphics determination module 119 determines based on the calculated $D_{gtotal}$ and thresholds $TH_1$ and $TH_2$ whether the input video signal is an actually captured video or graphics video. When $D_{gtotal}$ is greater than threshold $TH_1$, the graphics determination module 119 turns graphics determination on. When $D_{gtotal}$ is less than threshold $TH_2$, the graphics determination module 119 turns graphics determination off.

Upon further considering the genre information (EPG information) in this determination, when the genre information indicates a genre corresponding to a graphics video such as "animation", the graphics determination module 119 sets one or both of thresholds $TH_1$ and $TH_2$ to be small. The graphics determination module 119 makes determination based on the threshold or thresholds which are set to be small. Therefore, when the genre information indicates a genre corresponding to a graphics video such as "animation", the input video signal is more easily determined as a graphics video (graphics determination on).

On the other hand, when the genre information indicates a genre corresponding to an actually captured video such as "news", the graphics determination module 119 sets one or both of thresholds $TH_1$ and $TH_2$ to be large. The graphics determination module 119 makes determination based on the threshold or thresholds which are set to be large. Therefore, when the genre information indicates a genre corresponding to an actually captured video such as "news", the input video signal is more easily determined as an actually captured video (graphics determination off).

Whether or not an input video signal is an actually captured video or graphics video can be determined more accurately using the luminance histogram of the input video signal and the EPG information (genre information) appended to the input video signal than determination using only one of these pieces of information.

The PSF-based correction selection module 113 changes the imaging model function based on the graphics determination result based on the EPG information and histogram. Note that the graphics determination module 119 may determine based on one of the EPG information and histogram whether an input video signal is an actually captured video or graphics video.

Figure 8:
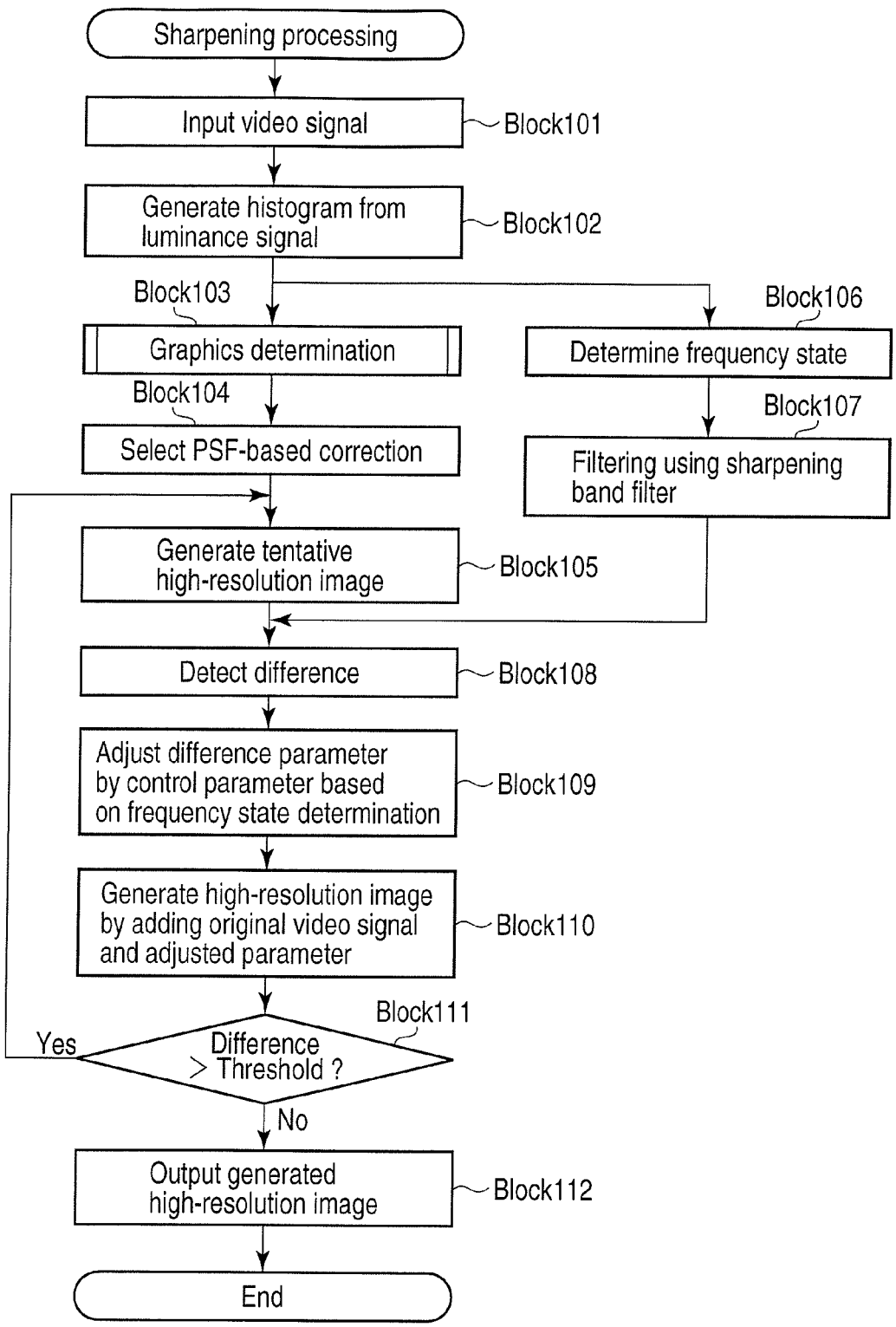
FIG. 8 is a flowchart showing an example of the sequence of sharpening processing by the video processing apparatus according to the first to fifth embodiments.

FIG. 8 is a flowchart showing an example of the sequence of sharpening processing by the sharpening processing module 108 using the processing result of the histogram detection module 104.

A video signal 101 is input to the histogram detection module 104 and sharpening processing module 108 (Block 101). A luminance signal Y included in the video signal 101 is input to the histogram detection module 104. The luminance signal Y, a color difference signal Cb/Pb, and a color difference signal Cr/Pr included in the video signal 101 are input to the sharpening processing module 108.

The histogram detection module 104 generates a histogram for each frame from the input luminance signal Y based on luminance levels of pixels (Block 102). More specifically, the histogram detection module 104 calculates the numbers of pixels for respective luminance levels by counting pixels for respective luminance levels for each frame included in the luminance signal Y.

The graphics determination module 119 determines based on the calculated numbers of pixels for respective luminance levels (histogram) whether the video signal 101 is non-graphics video or graphics video (Block 103). The sequence of the graphics determination processing by the graphics determination module 119 will be described later with reference to the flowchart shown in FIG. 9.

The PSF-based correction selection module 113 selects a PSF (imaging model function) used in correction based on the graphics determination result (Block 104). More specifically, when the control parameter 120 indicates graphics determination is off (when the video signal is determined as non-graphics video), the PSF-based correction selection module 113 sets the PSF that takes into account image blur in the imaging model function used in correction. On the other hand, when the control parameter 120 indicates graphics determination is on (when the video signal is determined as graphics video), the PSF-based correction selection module 113 sets the PSF that does not take into account any image blur in the imaging model function used in correction.

The tentative high-resolution image generation module 111 generates a tentative high-resolution image by correcting an image (pixels in the horizontal direction) held by the high-resolution image generation module 114 based on the imaging model function set by the PSF-based correction selection module 113 (Block 105). Note that a high-resolution image held by the high-resolution image generation module 114 is an image based on the input video signal in an initial state.

Parallel to the processes of Blocks 103 to 105, the frequency state determination module 105 detects the frequency state of the input luminance signal Y using the histogram for each frame generated by the histogram detection module 104 (Block 106). More specifically, the frequency state determination module 105 generates the filter control parameter 106 required to extract components to be sharpened from the video signal and the sharpening effect control parameter (sharpening effect gain/low signal coring control signal) 107 required to decide a sharpening effect based on the frequency distribution of the luminance signal Y. The frequency state determination module 105 outputs the calculated filter control parameter 106 to the sharpening band filter 109 and the sharpening effect control parameter 107 to the parameter adjustment module 121.

The horizontal filter 109a included in the sharpening band filter 109 extracts AC components to be sharpened from the luminance signal Y, color difference signal Cb/Pb, and color difference signal Cr/Pr included in the video signal 101 based on the filter control parameter 106a input from the frequency state determination module 105 (Block 107). The horizontal filter 109a outputs the extracted AC components to the difference detection module 110.

The vertical filter 109b included in the sharpening band filter 109 extracts components to be sharpened from the luminance signal Y, color difference signal Cb/Pb, and color difference signal Cr/Pr included in the video signal 101 based on the filter control parameter 106a or 106b from the frequency state determination module 105. The vertical filter 109b outputs the extracted components to the difference detection module 110.

The filter control parameter 106b is that obtained by correcting the filter control parameter 106a based on the PSF in the vertical direction (video model function). The switching circuit 118 decides based on the control parameter 120 which of the filter control parameters 106a and 106b is to be used. For example, the switching circuit 118 decides use of the filter control parameter 106a based on the control parameter 120 corresponding to graphics determination being on, and outputs the filter control parameter 106a as the selection signal 116. Or the switching circuit 118 decides use of the filter control parameter 106b based on the control parameter 120 corresponding to graphics determination being off, and outputs the filter control parameter 106b as the selection signal 116.

Then, the difference detection module 110 generates the difference parameter 112 indicating a difference between the tentative high-resolution image generated by the tentative high-resolution image generation module 111 and the AC components extracted by the sharpening band filter 109 (Block 108). The difference detection module 110 outputs the generated difference parameter 112 to the parameter adjustment module 121.

The parameter adjustment module 121 adjusts the difference parameter 112 generated by the difference detection module 110 using the sharpening effect control parameter 107 generated by the frequency state determination module 105 (Block 109). The parameter adjustment module 121 outputs the adjusted parameter 115 to the high-resolution image generation module 114.

The high-resolution image generation module 114 generates a high-resolution image by adding the parameter 115 to the original video signal 101 (luminance signal Y, color difference signal Cb/Pb, and color difference signal Cr/Pr) (Block 110). Then, the high-resolution image generation module 114 determines whether or not the difference detected by the difference detection module 110 is greater than a threshold (Block 111). If the difference is greater than the threshold (YES in Block 111), the process returns to Block 105. If the difference is equal to or less than the threshold (NO in Block 111), the high-resolution image generation module 114 outputs the generated high-resolution image (Block 112).

Figure 9:
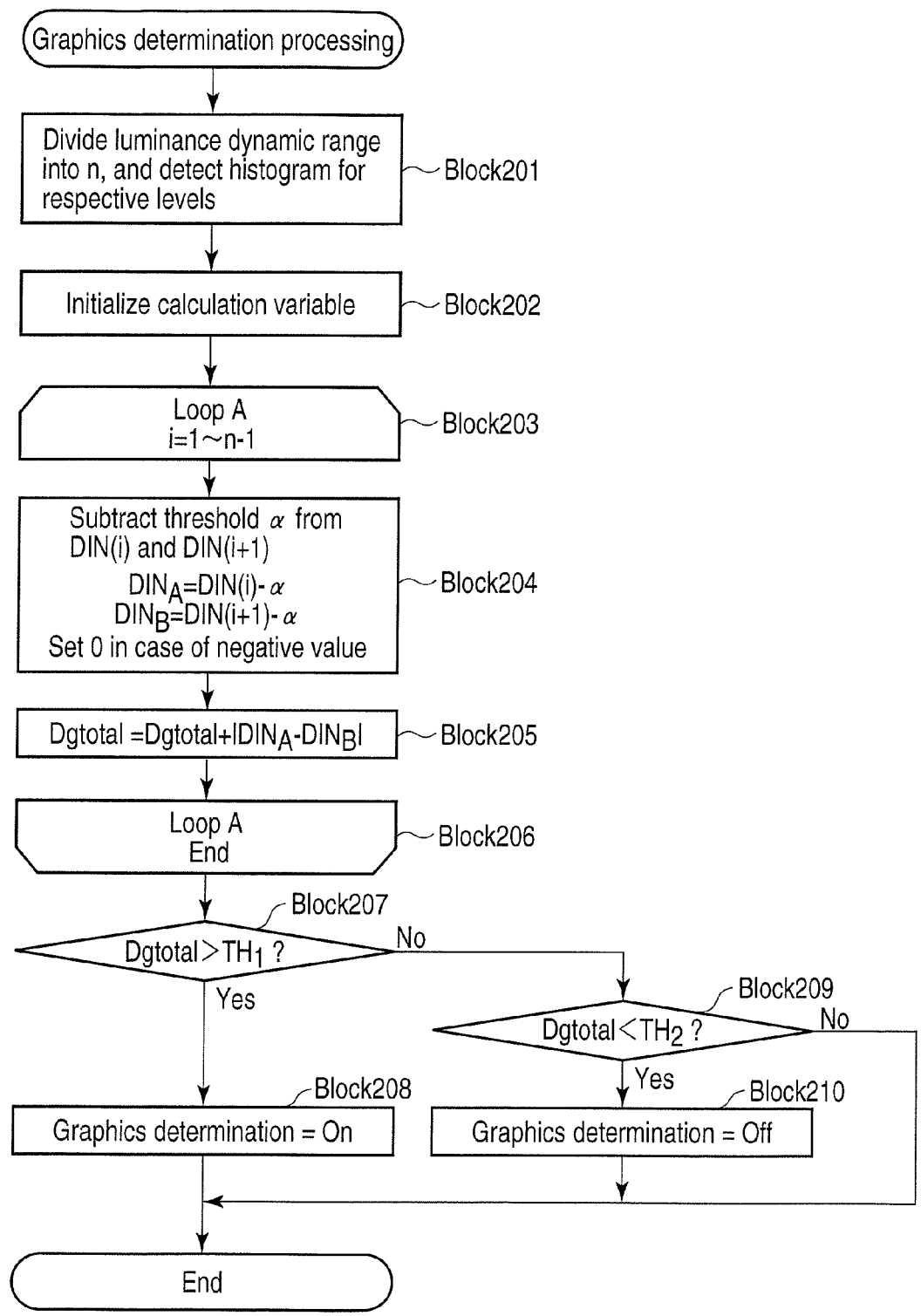
FIG. 9 is a flowchart showing an example of the sequence of graphics determination processing by the video processing apparatus according to the first to fifth embodiments.

FIG. 9 is a flowchart showing an example of the sequence of the graphics determination processing corresponding to Block 103 in the flowchart shown in FIG. 8. The graphics determination module 119 determines whether a video signal input to the television receiver 11 is non-graphics video or graphics video. When the input video signal is non-graphics video, the graphics determination module 119 turns graphics determination off; when the input signal is graphics video, it turns graphics determination on.

The graphics determination module 119 divides a luminance dynamic range into n, and generates a histogram based on luminance levels of n steps (Block 201). The graphics determination module 119 calculates the numbers DIN(1) to DIN(n) of pixels for respective luminance levels by counting pixels for respective luminance levels included in the luminance signal Y for each frame.

The graphics determination module 119 then initializes a variable $D_{gtotal}$ used in determination (Block 202). The graphics determination module 119 sets 0 in $D_{gtotal}$.

The graphics determination module 119 sets 1 in a variable i for iterative processing (loop A) (Block 203). Note that the variable i can assume a value ranging from 1 to n−1.

The graphics determination module 119 calculates $DIN_A$ and $DIN_B$ by subtracting a threshold α from DIN(i) and DIN(i+1) respectively (Block 204). If $DIN_A$ assumes a negative value, the graphics determination module 119 sets 0 in $DIN_A$. Likewise, if $DIN_B$ assumes a negative value, the graphics determination module 119 sets 0 in $DIN_B$. Then, the graphics determination module 119 sets, in the variable $D_{gtotal}$, a value obtained by adding the absolute value of a difference between $DIN_A$ and $DIN_B$ to the value set in the variable $D_{gtotal}$ (Block 205).

The graphics determination module 119 determines whether or not the variable i is equal to or greater than (n−1) (Block 206). If the variable i is not equal to or greater than (n−1), the graphics determination module 119 adds 1 to the variable i to execute the processes of loop A (Blocks 203 to 206) again.

If the variable i is equal to or greater than (n−1), the graphics determination module 119 ends the processes of loop A. The graphics determination module 119 then determines whether $D_{gtotal}$ is greater than threshold $TH_1$ (Block 207). If $D_{gtotal}$ is greater than threshold $TH_1$ (YES in Block 207), the graphics determination module 119 turns graphics determination on (Block 208).

If $D_{gtotal}$ is equal to or less than threshold $TH_1$ (NO in Block 207), the graphics determination module 119 determines whether $D_{gtotal}$ is less than threshold $TH_2$ (Block 209). If $D_{gtotal}$ is less than threshold $TH_2$ (YES in Block 209), the graphics determination module 119 turns graphics determination off (Block 210). On the other hand, if $D_{gtotal}$ is equal to or greater than threshold $TH_2$ (NO in Block 209), the graphics determination module 119 maintains the graphics determination result for the immediately preceding video frame. In this case, if the frame to be processed (current frame) is the first frame of the video signal, the graphics determination module 119 turns graphics determination off. That is, an initial value of graphics determination is set to be off.

With the above processing, the graphics determination module 119 determines whether the input video signal is non-graphics video or graphics video. When the input video signal is non-graphics video, the graphics determination module 119 turns graphics determination off; when the input signal is graphics video, it turns graphics determination on. The PSF-based correction selection module 113 changes (switches) the imaging model function according to the graphics determination result. Also, the switching circuit 118 changes (switches) the filter control parameter according to the graphics determination result. As a result, the sharpening processing module 108 can apply sharpening processing and image blur reduction correction suited to the input video signal.

That is, when graphics determination is off (when the input video signal is non-graphics video), the sharpening processing module 108 applies image blur reduction correction to pixels in the horizontal direction based on the PSF that takes into account image blur (imaging model function). Furthermore, the sharpening processing module 108 applies sharpening processing to the pixels in the horizontal direction based on the filter control parameter 106a, and applies sharpening processing and image blur reduction correction to pixels in the vertical direction based on the filter control parameter 106b.

When graphics determination is on (when the input video signal is graphics video), the sharpening processing module 108 processes pixels in the horizontal direction (without any image blur reduction correction) based on the PSF that does not take into account any image blur (imaging model function), and applies sharpening processing to pixels in the horizontal and vertical directions based on the filter control parameter 106a.

In this way, by applying the sharpening processing and image blur reduction correction according to the nature of the input video signal, image quality can be improved.

Figure 10:
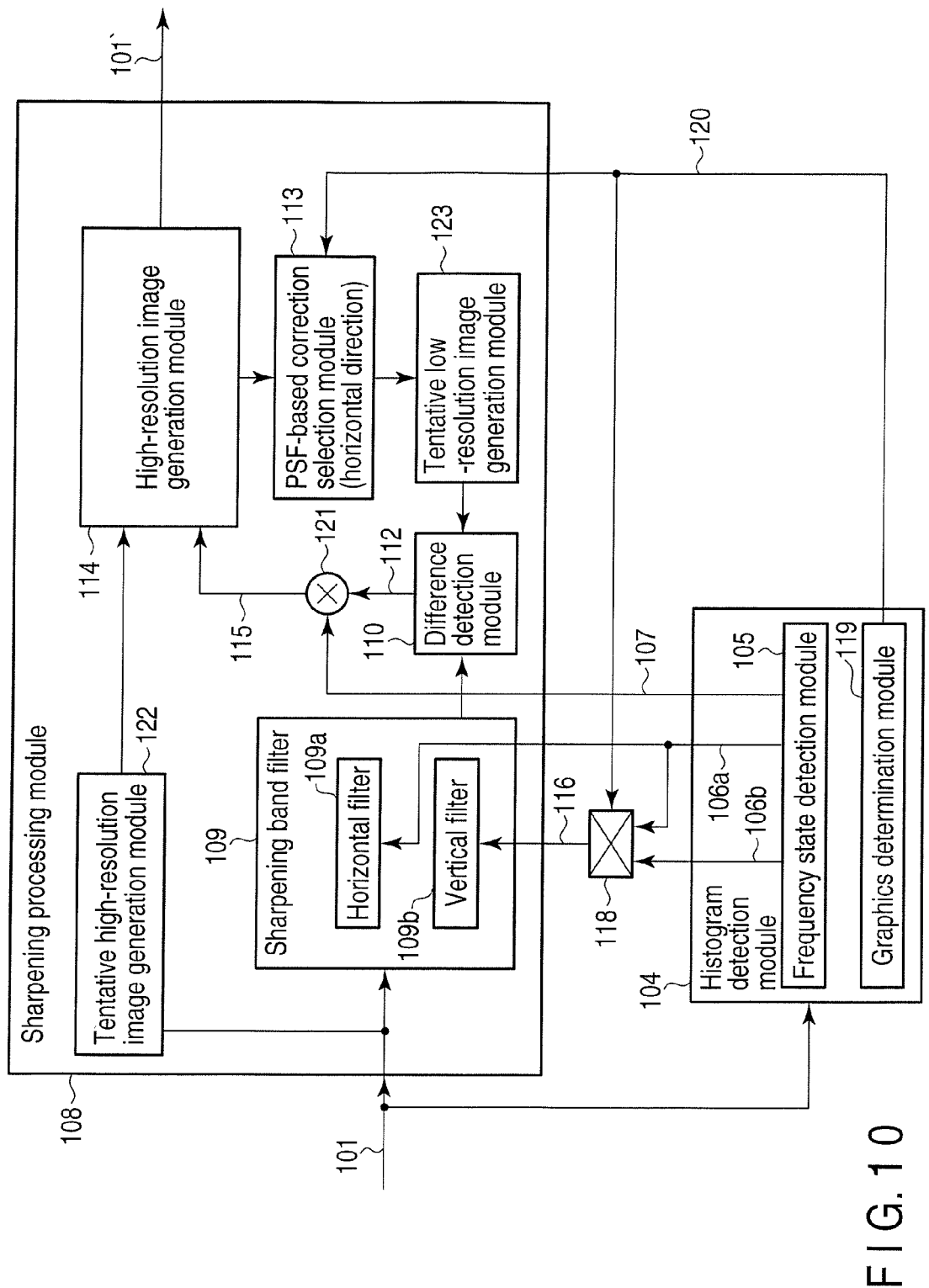
FIG. 10 is a block diagram showing an example of the partial arrangement of the video processing apparatus according to the second embodiment.

A video processing apparatus (digital television receiver 11) according to the second embodiment will be described below with reference to FIG. 10. In this embodiment, differences from the video processing apparatus according to the first embodiment will be mainly described. As shown in FIG. 10, a sharpening processing module 108 has a function of up-converting an input video signal. This function is used when an SD video of, e.g., DVD video or a quasi-high-resolution video of, e.g., terrestrial digital broadcasting is converted into a high-resolution video. Therefore, in the second embodiment, up-conversion processing (scaling processing) is applied to an input video signal, and sharpening processing is then applied to the up-converted video signal. The sharpening processing module 108 of the second embodiment includes a tentative high-resolution image generation module 122. Note that the sharpening processing module 108 of the second embodiment includes the tentative low-resolution image generation module 123 in place of the tentative high-resolution image generation module 111 included in the sharpening processing module 108 of the first embodiment.

The tentative high-resolution image generation module 122 up-converts an input video signal. The tentative high-resolution image generation module 122 converts an input video signal of a first resolution (low-resolution image) into a video signal of a second resolution (high-resolution image) which is the resolution of video to be displayed on a video display unit 14 and is higher than the first resolution. The tentative high-resolution image generation module 122 outputs the up-converted video signal to a high-resolution image generation module 114.

The tentative low-resolution image generation module 123 applies correction based on an imaging model function and down-conversion to a high-resolution image output from the high-resolution image generation module 114. The tentative low-resolution image generation module 123 converts the high-resolution image of the second resolution into a low-resolution image of the first resolution by the down-conversion. The tentative low-resolution image generation module 123 outputs the down-converted image (video signal) to a difference detection module 110.

The difference detection module 110 generates a difference parameter 112 indicating a difference between the tentative low-resolution image generated by the tentative low-resolution image generation module 123 and AC components extracted by a sharpening band filter 109. The difference detection module 110 outputs the generated difference parameter 112 to a parameter adjustment module 121.

The parameter adjustment module 121 generates a parameter 115 by adjusting the difference parameter 112 generated by the difference detection module 110 using a sharpening effect control parameter 107 generated by a frequency state determination module 105. The parameter adjustment module 121 outputs the generated parameter 115 to the high-resolution image generation module 114.

The high-resolution image generation module 114 adds the parameter 115 to an original video signal 101 (luminance signal Y, color difference signal Cb/Pb, and color difference signal Cr/Pr). The high-resolution image generation module 114 outputs a video signal 101' (luminance signal Y', color difference signal Cb'/Pb', and color difference signal Cr'/Pr') sharpened by the aforementioned processing.

The aforementioned video processing apparatus according to the second embodiment can correct sharpening processing and image blur reduction correction according to the nature of an input video signal and can improve image quality as in the video processing apparatus according to the first embodiment.

Figure 11:
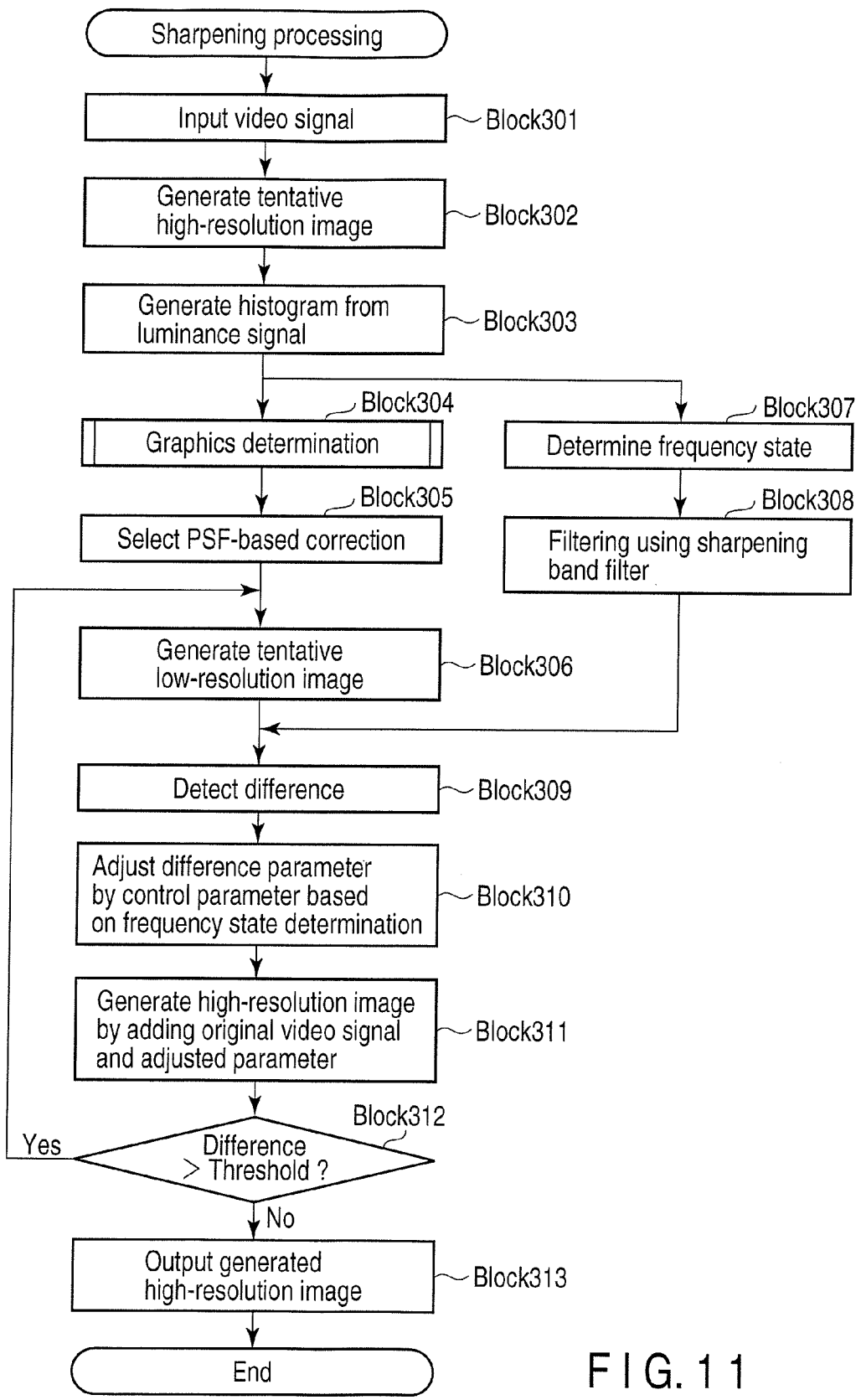
FIG. 11 is a flowchart showing an example of the sequence of sharpening processing by the video processing apparatus according to the second embodiment.

FIG. 11 is a flowchart showing an example of the sequence of sharpening processing according to a modification of the video processing apparatus of the embodiment shown in FIG. 10.

A signal processing module 51 and video processing module 62 respectively input a video signal to a histogram detection module 104 and the sharpening processing module 108 (Block 301). The signal processing module 51 inputs a luminance signal Y included in the video signal to the histogram detection module 104. The video processing module 62 inputs the luminance signal Y, a color difference signal Cb/Pb, and a color difference signal Cr/Pr included in the video signal to the sharpening processing module 108.

The tentative high-resolution image generation module 122 generates a tentative high-resolution image by up-converting the video signal (Block 302). The tentative high-resolution image generation module 122 outputs the up-converted video signal to the high-resolution image generation module 114.

The histogram detection module 104 generates a histogram for each frame from the input luminance signal Y based on luminance levels of pixels (Block 303). More specifically, the histogram detection module 104 calculates the numbers of pixels for respective luminance levels by counting pixels for respective luminance levels included in the luminance signal Y for each frame.

A graphics determination module 119 then determines based on the calculated numbers of pixels for respective luminance levels (histogram) whether the video signal is non-graphics video or graphics video (Block 304). The sequence of the graphics determination processing by the graphics determination module 119 will be described later with reference to the flowchart shown in FIG. 9.

A PSF-based correction selection module 113 selects a PSF (imaging model function) used in correction based on the graphics determination result (Block 305). More specifically, when a control parameter 120 indicates graphics determination is off (when the video signal is determined as non-graphics video), the PSF-based correction selection module 113 sets the PSF that takes into account image blur in the imaging model function used in correction. On the other hand, when the control parameter 120 indicates graphics determination is on (when the video signal is determined as a graphics video), the PSF-based correction selection module 113 sets the PSF that does not take into account any image blur in the imaging model function used in correction.

The tentative low-resolution image generation module 123 generates a tentative low-resolution image by applying correction to pixels in the horizontal direction of an image held by the high-resolution image generation module 114 based on the imaging model function set by the PSF-based correction selection module 113 and down-conversion to the image held by the high-resolution image generation module 114 (Block 306). Note that a high-resolution image held by the high-resolution image generation module 114 is a tentative high-resolution image input from the tentative high-resolution image generation module 122 in an initial state. Also, the resolution of the tentative low-resolution image generated by tentative low-resolution image generation module 123 is the same as that of the original video signal (input video signal).

Parallel to the processes of Blocks 304 to 306, the frequency state determination module 105 detects the frequency state of the input luminance signal Y using the histogram for each frame generated by the histogram detection module 104 (Block 307). More specifically, the frequency state determination module 105 generates a filter control parameter 106a required to extract components to be sharpened from the video signal and a sharpening effect control parameter (sharpening effect gain/low signal coring control signal) 107 required to decide a sharpening effect based on the frequency distribution of the luminance signal Y. The frequency state determination module 105 outputs the calculated filter control parameter 106a to a horizontal filter 109a included in the sharpening band filter 109 and the sharpening effect control parameter 107 to the parameter adjustment module 121.

The horizontal filter 109a included in the sharpening band filter 109 extracts AC components to be sharpened from the luminance signal Y, color difference signal Cb/Pb, and color difference signal Cr/Pr included in the video signal 101 based on the filter control parameter 106a input from the frequency state determination module 105 (Block 308). The horizontal filter 109a outputs the extracted AC components to the difference detection module 110.

A vertical filter 109b included in the sharpening band filter 109 extracts components to be sharpened from the luminance signal Y, color difference signal Cb/Pb, and color difference signal Cr/Pr included in the video signal 101 based on the filter control parameter 106a or a filter control parameter 106b from the frequency state determination module 105. The vertical filter 109b outputs the extracted components to the difference detection module 110.

The filter control parameter 106b is that obtained by correcting the filter control parameter 106a based on the PSF in the vertical direction (video model function). A switching circuit 118 decides based on the control parameter 120 which of the filter control parameters 106a and 106b is to be used. For example, the switching circuit 118 decides use of the filter control parameter 106a based on the control parameter 120 corresponding to graphics determination being on, and outputs the filter control parameter 106a as a selection signal 116. Or the switching circuit 118 decides use of the filter control parameter 106b based on the control parameter 120 corresponding to graphics determination being off, and outputs the filter control parameter 106b as the selection signal 116.

Then, the difference detection module 110 generates the difference parameter 112 indicating a difference between the tentative low-resolution image generated by the tentative low-resolution image generation module 123 and the AC components extracted by the sharpening band filter 109 (Block 309). The difference detection module 110 outputs the generated difference parameter 112 to the parameter adjustment module 121.

The parameter adjustment module 121 adjusts the difference parameter 112 generated by the difference detection module 110 using the sharpening effect control parameter 107 generated by the frequency state determination module 105 (Block 310). The parameter adjustment module 121 outputs the adjusted parameter 115 to the high-resolution image generation module 114.

The high-resolution image generation module 114 generates a high-resolution image by adding the parameter 115 to the original video signal 101 (luminance signal Y, color difference signal Cb/Pb, and color difference signal Cr/Pr) (Block 311). Then, the high-resolution image generation module 114 determines whether or not the difference detected by the difference detection module 110 is greater than a threshold (Block 312). If the difference is greater than the threshold (YES in Block 312), the process returns to Block 306. If the difference is equal to or less than the threshold (NO in Block 312), the high-resolution image generation module 114 outputs the generated high-resolution image (Block 313).

With the aforementioned processes, the video processing apparatus of the second embodiment can generate a high-resolution image by applying up-conversion processing to an input video signal (low-resolution image) and then applying sharpening processing and image blur reduction correction to the up-converted video signal. In this case, the sharpening processing module 108 switches the imaging model function according to the graphics determination result, and can apply sharpening processing and image blur reduction correction suited to the input video signal. The video processing apparatus of the second embodiment enhances the resolution of the input video signal and applies the sharpening processing and image blur reduction correction to the input video signal according to the nature of the input video signal, thereby improving image quality.

Note that this embodiment has exemplified the case in which the signal processing module 51 includes the histogram detection module 104 and the video processing module 62 includes the sharpening processing module 108. Alternatively, the signal processing module 51 may include both the histogram detection module 104 and sharpening processing module 108.

With the above processing, the graphics determination module 119 determines whether the input video signal is non-graphics video or graphics video. When the input video signal is non-graphics video, the graphics determination module 119 turns graphics determination off; when the input signal is graphics video, it turns graphics determination on.

The PSF-based correction selection module 113 changes (switches) the PSF according to the graphics determination result. Also, the switching circuit 118 changes (switches) the filter control parameter according to the graphics determination result. As a result, the sharpening processing module 108 can apply sharpening processing and image blur reduction correction suited to the input video signal.

That is, when graphics determination is off (when the input video signal is non-graphics video), the sharpening processing module 108 applies image blur reduction correction to pixels in the horizontal direction based on the PSF that takes into account image blur (imaging model function). Furthermore, the sharpening processing module 108 applies sharpening processing to the pixels in the horizontal direction based on the filter control parameter 106a, and applies sharpening processing and image blur reduction correction to pixels in the vertical direction based on the filter control parameter 106b.

When graphics determination is on (when the input video signal is graphics video), the sharpening processing module 108 processes pixels in the horizontal direction (without any image blur reduction correction) based on the PSF that does not take into account any image blur (imaging model function), and applies sharpening processing to pixels in the horizontal and vertical directions based on the filter control parameter 106a.

In this way, by applying the sharpening processing and image blur reduction correction according to the nature of the input video signal, image quality can be improved.

Note that in the example of the above description, whether an input video signal is non-graphics video or graphics video is determined to switch the imaging model function. Alternatively, imaging model functions suited to the nature of further segmented video types in addition to non-graphics and graphics video may be set.

Figure 15:
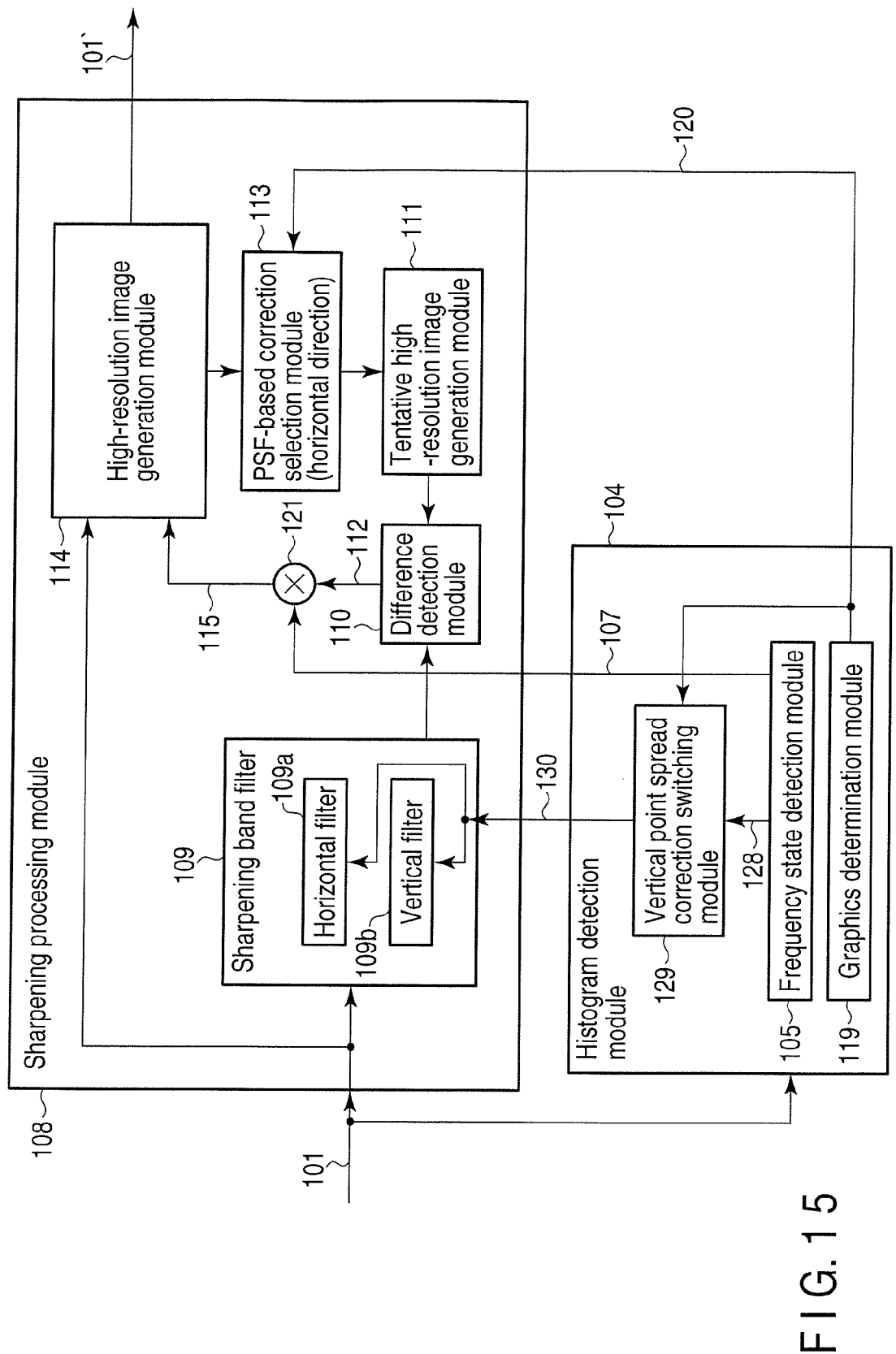
FIG. 15 is a block diagram showing an example of the partial arrangement of the video processing apparatus according to the third embodiment.

A video processing apparatus (digital television receiver 11) according to the third embodiment will be described below with reference to FIGS. 15 to 17. FIG. 15 is a block diagram showing the video processing apparatus (digital television receiver 11) according to the third embodiment.

In the video processing apparatus of the first and second embodiments, a switching circuit 118 outside a histogram detection module 104 selects a filter control parameter 106a or 106b. However, the video processing apparatus of the third embodiment decides the filter control parameter in the histogram detection module 104.

A vertical point spread correction switching module 129 outputs, based on a control parameter 120 indicating graphics determination is on, a filter control parameter 128 from a frequency state determination module 105 as a selection signal 130 (FIG. 17). Or the vertical point spread correction switching module 129 outputs, based on the control parameter 120 indicating graphics determination is off, a filter control parameter 128 which is corrected based on a PSF (video model function) in the vertical direction as a selection signal 130 (FIG. 16).

FIG. 16 shows an example of the filter control parameter which is corrected based on the PSF (video model function) in the vertical direction. This filter control parameter is applied to non-graphics video. FIG. 17 shows an example of the filter control parameter which is not corrected based on the PSF (video model function) in the vertical direction. This filter control parameter is applied to a graphics video.

Figure 18:
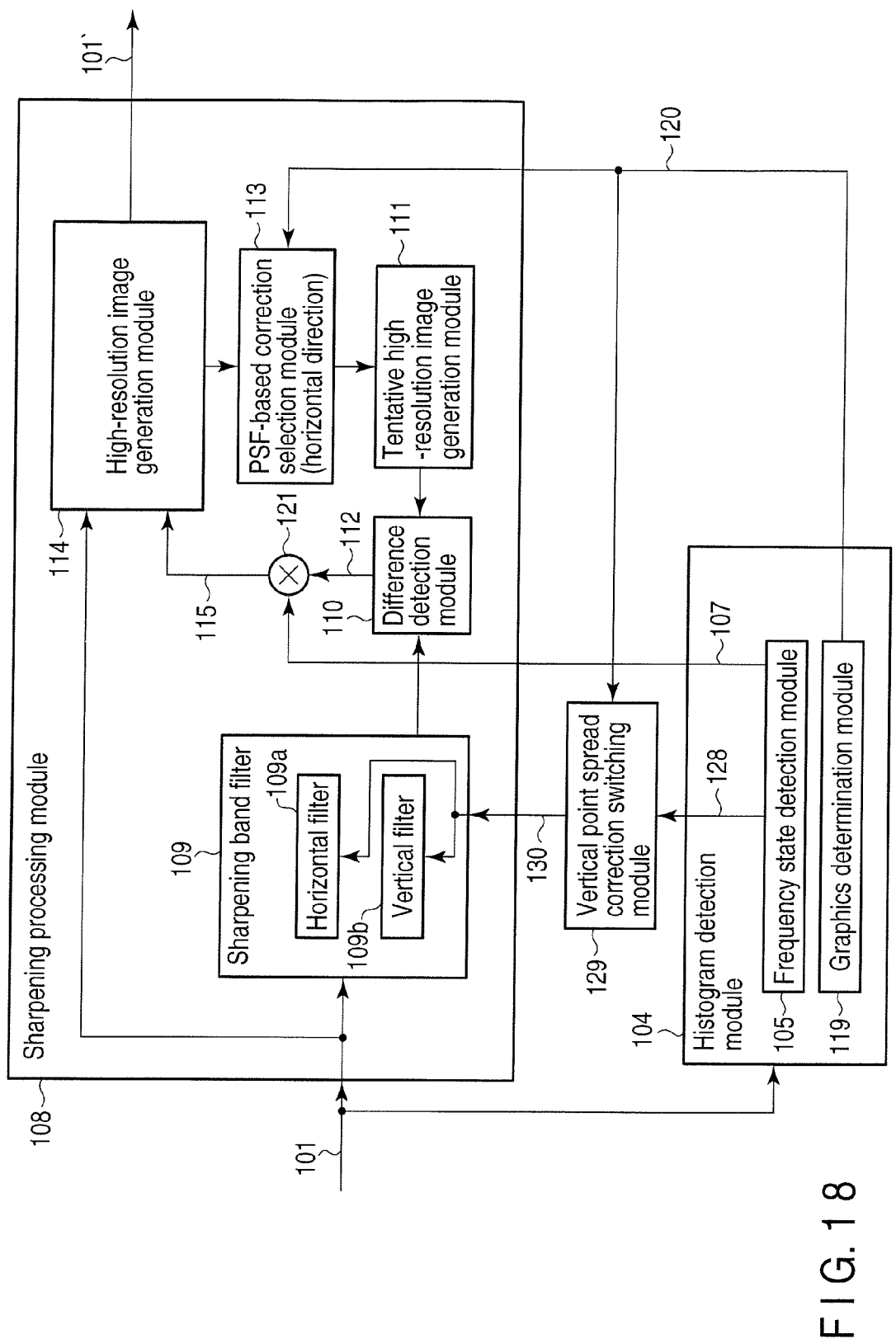
FIG. 18 is a block diagram showing an example of the partial arrangement of the video processing apparatus according to the fourth embodiment.

A video processing apparatus (digital television receiver 11) according to the fourth embodiment will be described below with reference to FIG. 18. FIG. 18 is a block diagram showing the video processing apparatus (digital television receiver 11) according to the fourth embodiment.

In the video processing apparatus of the third embodiment, a histogram detection module 104 includes a vertical point spread correction switching module 129. By contrast, the video processing apparatus of the fourth embodiment includes the vertical point spread correction switching module 129 outside the histogram detection module 104.

Figure 19:
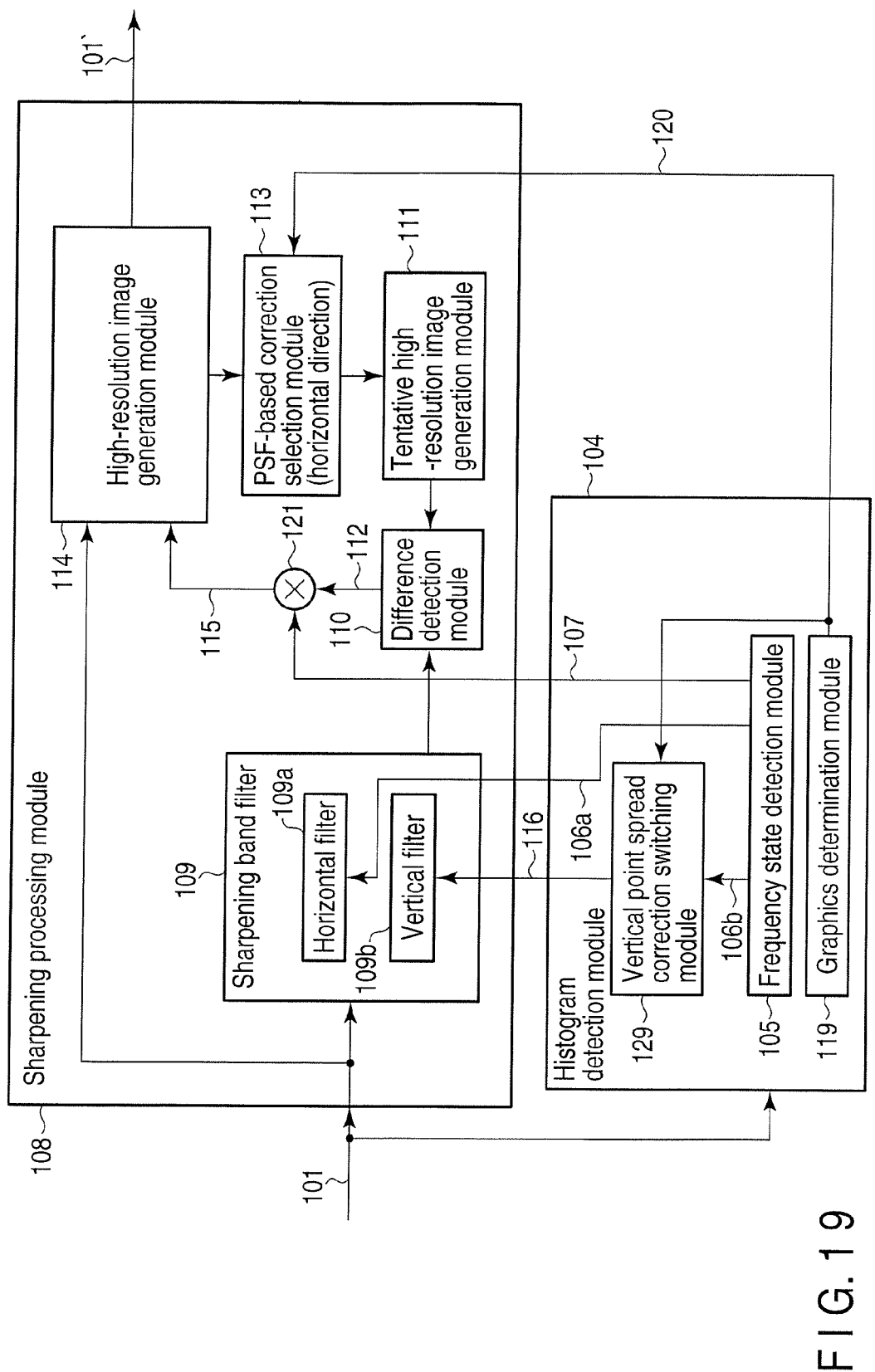
FIG. 19 is a block diagram showing an example of the partial arrangement of the video processing apparatus according to the fifth embodiment.

A video processing apparatus (digital television receiver 11) according to the fifth embodiment will be described below with reference to FIG. 19. FIG. 19 is a block diagram showing the video processing apparatus (digital television receiver 11) according to the fifth embodiment.

The video processing apparatus of the fifth embodiment includes a vertical point spread correction switching module 129 in a histogram detection module 104. The vertical point spread correction switching module 129 decides use of a filter control parameter 106a based on a control parameter 120 corresponding to graphics determination being on, and outputs the filter control parameter 106a as a selection signal 116 (FIG. 22). On the other hand, the vertical point spread correction switching module 129 decides use of a filter control parameter 106b based on the control parameter 120 corresponding to graphics determination being off, and outputs the filter control parameter 106b as a selection signal 116 (FIG. 21).

Figure 20:
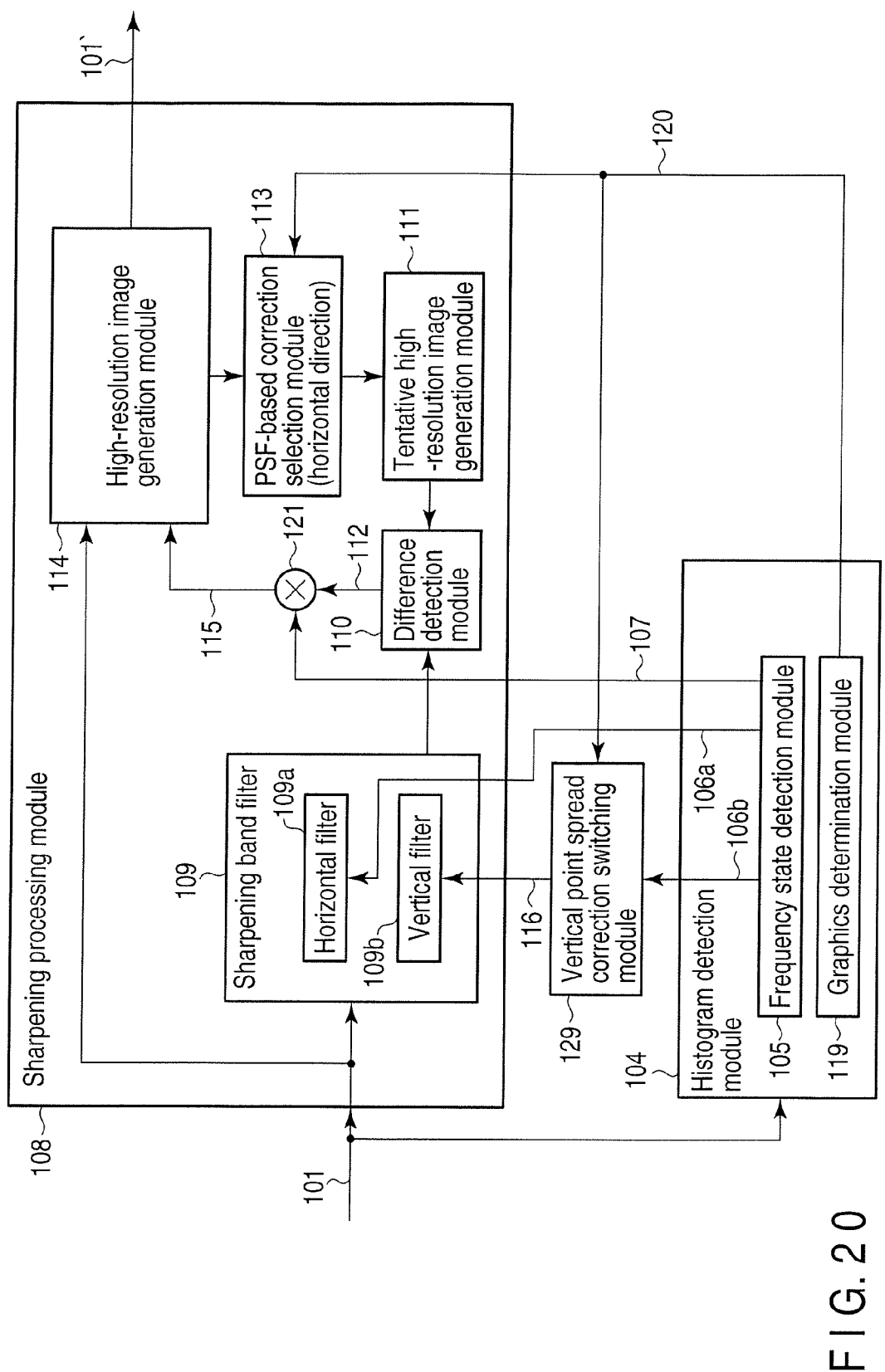
FIG. 20 is a block diagram showing an example of the partial arrangement of the video processing apparatus according to the sixth embodiment.

A video processing apparatus (digital television receiver 11) according to the sixth embodiment will be described below with reference to FIG. 20. FIG. 20 is a block diagram showing the video processing apparatus (digital television receiver 11) according to the sixth embodiment.

The video processing apparatus of the fifth embodiment includes a vertical point spread correction switching module 129 in a histogram detection module 104. By contrast, the video processing apparatus of the sixth embodiment includes the vertical point spread correction switching module 129 outside the histogram detection module 104.

With the above arrangement, the video processing apparatus according to each of the first to fifth embodiments can apply image blur reduction correction not only to pixels in the horizontal direction but also to those in the vertical direction. The tentative high-resolution image generation module 111 generates a tentative high-resolution image by applying image blur reduction correction for pixels in the horizontal direction based on the PSF in the vertical direction (imaging model function) selected by the PSF-based correction selection module 113. The filter characteristics of the vertical filter 109b are corrected based on the PSF in the vertical direction (video model function), thereby also applying image blur reduction correction to pixels in the vertical direction. In this way, the video processing apparatus applies image blur reduction correction to pixels in the horizontal and vertical directions, thus providing a sharper video with higher definition.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video processing apparatus comprising:
an input module configured to input a video signal;
a video processor including a sharpening processor configured to apply sharpening processing to pixels in a horizontal direction and pixels in a vertical direction, which are included in the video signal, and a correction module configured to apply image blur correction to the pixels in the horizontal direction and the pixels in the vertical direction based on an imaging model function; and
a detector configured to detect a type of the video signal from the video signal whether corresponding graphics or other than graphics,
wherein the sharpening processor comprises a sharpening horizontal filter for the sharpening processing to the pixels in the horizontal direction and a sharpening vertical filter for the sharpening processing to the pixels in the vertical direction, applies the sharpening processing by the sharpening horizontal filter and the sharpening vertical filter based on a first parameter depending on a graphics detection result by the detector, and applies the sharpening processing by the sharpening horizontal filter based on the first parameter and the sharpening processing by the sharpening vertical filter based on a second parameter depending on a detection result other than the graphics detection result by the detector,
the first parameter is used to vary a sharpening effect depending on a case in which the video signal includes few high-frequency components or a case in which the video signal includes many high-frequency components, and the second parameter is obtained by correcting the first parameter based on the imaging model function,
the correction module is configured to apply the image blur correction to the pixels in the horizontal direction based on the imaging model function and to apply the image blur correction to the pixels in the vertical direction by the sharpening vertical filter based on the second parameter depending on the detection result other than the graphics detection result by the detector.

2. The apparatus of claim 1, further comprising a switching module configured to switch a characteristic of non-application of the image blur correction by the first parameter corresponding to a frequency band of the video signal based on the graphics detection result by the detector, and to switch a characteristic of the sharpening vertical filter to a characteristic of application of the image blur correction according to a second parameter obtained by correcting the first parameter based on the imaging model function depending on the detection result other than the graphics detection result by the detector.

3. The apparatus of claim 2, further comprising a controller configured to change a characteristic of the sharpening horizontal filter according to the first parameter into a characteristic of non-application of the image blur correction.

4. The apparatus of claim 1,
wherein the video processor is configured to non-apply the image blur correction to the video signal based on the graphics detection result by the detector, and to apply the image blur correction to the video signal based on the detection result other than the graphics by the detector.

5. The apparatus of claim 1, wherein the switching module is configured to control the characteristic of the sharpening vertical filter according to the first parameter based on the graphics detection result by the detector, and to control the characteristic of the sharpening vertical filter according to the second parameter based on the detection result other than the graphics detection result by the detector.

6. A video processing method for applying sharpening processing to pixels in a horizontal direction and pixels in a vertical direction, which are included in the video signal, and for applying image blur correction to the pixels in the horizontal direction and the pixels in the vertical direction based on an imaging model function, comprising:

detecting a type of the video signal from the video signal whether corresponding graphics or other than graphics, wherein the sharpening processing is executed by a sharpening processor, the sharpening processor comprises a sharpening horizontal filter for the sharpening processing to the pixels in the horizontal direction and a sharpening vertical filter for the sharpening processing to the pixels in the vertical direction, applies the sharpening processing by the sharpening horizontal filter and the sharpening vertical filter based on a first parameter depending on a graphics detection result, and applies the sharpening processing by the sharpening horizontal filter based on the first parameter and the sharpening processing by the sharpening vertical filter based on a second parameter depending on a detection result other than the graphics detection result, the first parameter is used to vary a sharpening effect depending on a case in which the video signal includes few high-frequency components or a case in which the video signal includes many high-frequency components, and the second parameter is obtained by correcting the first parameter based on the imaging model function, the image blur correction is executed by a correction module, the correction module is configured to apply the image blur correction to the pixels in the horizontal direction based on the imaging model function and to apply the image blur correction to the pixels in the vertical direction by the sharpening vertical filter based on the second parameter depending on the detection result other than the graphics detection result.

* * * * *